July 1, 1924.
F. B. KING
CHAIN HOOK
Filed May 22, 1923
1,499,738
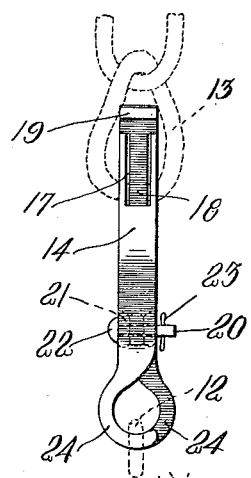
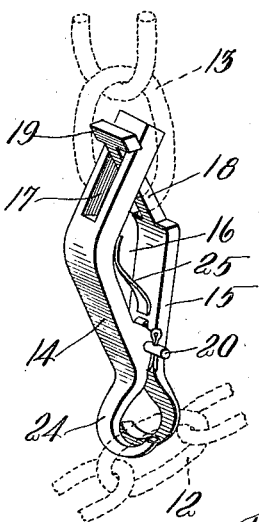
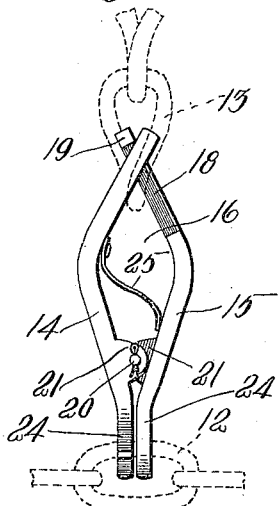
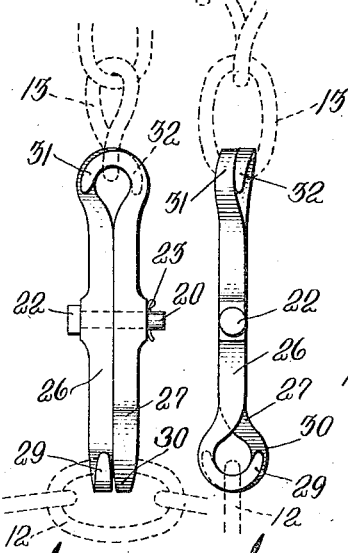
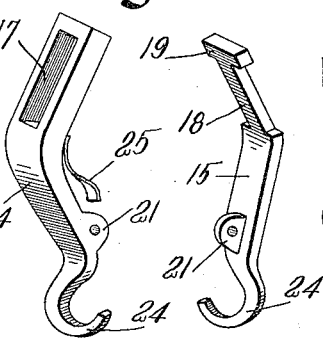
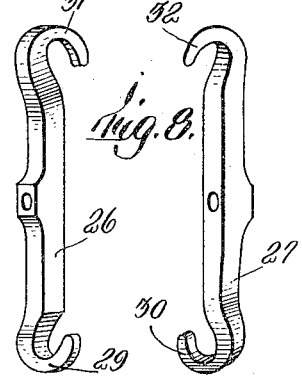
Inventor
Frank B. King Patented July 1, 1924.

1,499,738

UNITED STATES PATENT OFFICE.

FRANK B. KING, OF WAKEFIELD, MASSACHUSETTS.

CHAIN HOOK.

Application filed May 22, 1923. Serial No. 640,642.

*To all whom it may concern:*

Be it known that I, FRANK B. KING, a citizen of the United States, residing at Wakefield, in the county of Middlesex and State of Massachusetts, have invented new and useful Improvements in Chain Hooks, of which the following is a specification.

The object of this invention is to provide a device adapted for use in connecting an anti-skid chain which extends across the tread of a motor vehicle wheel, with the anchoring chains which bear on opposite sides of the rim of the wheel and extend around the same.

The invention is embodied in the improved coupling device which I call a double chain hook, hereinafter described and claimed.

Of the accompanying drawings forming a part of this specification,—

Figure 1 is a perspective view, showing a double hook embodying the invention, engaged with a portion of an anti-skid chain, and a portion of an anchoring chain.

Figures 2 and 3 show the double hook in elevation.

Figure 4 shows in perspective the members of the double hook separated from each other.

Figures 5 and 6 are side views, showing a double hook constituting another embodiment of the invention.

Figures 7 and 8 are perspective views of the members of the double hook shown by Figures 5 and 6.

The same reference characters indicate the same parts in all the figures.

In the drawings, 12 represents a portion of a continuous anchoring chain, which may be understood to be one of two chains located at opposite sides of the rim of a rubber tired motor vehicle wheel, each chain being continuous and forming a circle corresponding to the rim, so that any desired number of anti-skid chains 13 extending across the tread of the tire may be connected with the anchoring chains.

It will be understood that each anti-skid chain is of a length sufficient to enable it to extend from one side of the wheel rim, across the tire tread and to the opposite side of the wheel rim.

The double hook in which my invention is embodied is designed to connect the end portions of an anti-skid chain 13, with corresponding portions of the anchoring chains 12, there being two of these hooks for each anti-skid chain 13, the hooks being detachably engaged with the end links of the chain, and with suitable links of the anchoring chains 12.

In the embodiment shown by Figures 1, 2, 3 and 4, the double hook is composed of two members 14 and 15, each of angular form, the form being such that when they are detachably connected as hereinafter described, they collectively form a divisible outer eye or link, the opening 16 of which is adapted to receive a terminal link of the chain 13, as shown by Figures 1, 2 and 3. The member 14 is provided with a longitudinal slot 17, and the member 15 is provided with a reduced end portion 18, having a head 19, the form of the end portion and its head being such that the head is adapted to be passed through the slot 17, and then turned to extend crosswise of the slot, and prevent its withdrawal therefrom, as shown by Figure 1.

The members 14 and 15 are detachably connected by a coupling member such as a pin 20, removably inserted in ears 21, formed on the inner sides of the said members, the pin having at one end a head 22, and being perforated at the opposite end portion to receive a suitable stop, such as a cotter-pin 23, whereby its withdrawal from the ears 21 may be prevented.

Each of the members 14 and 15 is provided at one end with an open hook 24, adapted to enter a link of an anchoring chain 12, said hooks collectively constituting a divisible inner eye. The arrangement of the hooks 24 is such that when the members are connected, as shown by Figures 1, 2 and 3, the hooks are in parallel planes, one beside the other, the throats formed by the hooks opening in opposite directions, so that one hook may be inserted in a link of the chain 12, from one side of the chain, and the other hook from the opposite side.

To couple an anti-skid chain 13 to two anchoring chains 12, it is necessary to remove the pin 20, engage the end portion 18 with the slot 17, insert the hooks 24 in links of the anchoring chains 12, and insert the pin 20 in the ears 21. This operation securely connects the ends of the anti-skid chain with the anchoring chains and permits the ready separation of the parts.

I prefer to provide one of the members with a spring 25, bearing loosely on the other member, and normally holding the members in the positions shown by Figures 1, 2 and 3.

Figures 5, 6, 7 and 8 show another, and the preferred embodiment of the invention, which comprises two elongated members 26 and 27, and a coupling member 20, detachably connecting the members between their ends. The end portions of the members 26 and 27, at one side of the coupling member, are provided with inner open hooks 29 and 30, arranged side by side in parallel planes, and collectively constituting a divisible inner eye adapted to engage a link of the anchoring chain 12. The end portions at the opposite side of the coupling member are provided with outer open hooks 31 and 32, arranged side by side in parallel planes, and collectively constituting a divisible outer eye adapted to engage a link of an anti-skid chain 13.

In each of the described embodiments of the invention the plane of the inner eye is substantially at right angles with the plane of the outer eye, this arrangement enabling the eyes to conform to the links with which they are engaged, the engaged links of the anchoring chain being in planes substantially at right angles with the engaged links of the anti-skid chain.

I claim:

1. A securing device for anti-skid chains, comprising two elongated members, and a coupling member detachably connecting the elongated members, the ends of the elongated members being formed to constitute when connected two divisible eyes arranged in planes substantially at right angles to each other and adapted to respectively engage a link of an anchoring chain and a link of an anti-skid chain, the members of each divisible eye being separable only when the coupling member is detached.

2. A securing device for anti-skid chains comprising two elongated members each having an open hook at both ends, the hook at one end extending in a plane substantially at right angles to that at the other, and means for detachably connecting said members with the hooks at the ends thereof in overlapping relation and forming eyes adapted to be engaged, respectively, with a link of an anchoring chain and a link of an anti-skid chain.

3. A securing device for anti-skid chains, comprising two elongated members each having an open hook at both ends, the hook at one end extending in a plane substantially at right angles to that at the other, and provided with a transverse passage, a removable pin extending through said passages and having an enlarged head at one end, and means co-operating with the projecting portion of the said pin for retaining the elongated members in coupled relation with the hooks thereof overlapping and providing two eyes adapted to be engaged, respectively, with a link of an anchoring chain and a link of an anti-skid chain.

In testimony whereof I have affixed my signature.

FRANK B. KING.